United States Patent [19]

Stephenson

[11] Patent Number: 4,736,889

[45] Date of Patent: Apr. 12, 1988

[54] SHUT-OFF VALVE FOR SPRINKLER SYSTEM

[76] Inventor: John K. Stephenson, 9631 Cypress Park Way, Boynton Beach, Fla. 33400

[21] Appl. No.: 863,043

[22] Filed: May 14, 1986

[51] Int. Cl.$^4$ ............................................. F16K 17/04
[52] U.S. Cl. ................................... 239/204; 239/572; 137/498
[58] Field of Search ............... 239/542, 579, 570–572, 239/63, 68, 203–205, 590; 137/498, 497, 467, 513.3

[56] References Cited

U.S. PATENT DOCUMENTS

| | | | |
|---|---|---|---|
| 2,315,911 | 4/1943 | Truedson | 239/205 |
| 2,699,799 | 1/1955 | Wager | 137/498 X |
| 3,786,272 | 9/1973 | Hammond | 137/498 |
| 3,872,884 | 3/1975 | Busdicker et al. | 137/498 |
| 4,078,726 | 3/1978 | Walto | 239/590 X |
| 4,131,235 | 12/1978 | Lieding | 239/570 X |
| 4,345,593 | 8/1987 | Sullivan | 137/498 X |

FOREIGN PATENT DOCUMENTS 335529  3/1920  Fed. Rep. of Germany ...... 239/570

Primary Examiner—Andres Kashnikow
Assistant Examiner—Kevin Patrick Weldon
Attorney, Agent, or Firm—Harry W. Barron

[57] ABSTRACT

Disclosed herein is an automatic shut off valve for a sprinkler system which closes the water flow path whenever a sprinkler head becomes dislodged from a riser pipe. The shut off valve includes a valve seat and a valve element. The valve element is attached to the stem of a valve assembly, which further includes a flange positioned in the water flow path. The valve element assembly is held away from the valve seat by a coil spring into which the stem of the valve assembly extends. The stem further includes a plurality of openings to allow water flow into the center of the flange and out through openings in the stem and thereafter through the center of the valve seat. The spring is calibrated in length and compression such that, during normal water flow with a head attached, the spring is not sufficiently compressed to allow the valve element to contact the valve seat. However, when the head becomes dislodged, the water flow increases significantly, thereby further compressing the spring so that the valve element comes in sealed contact with the valve seat and thereafter, the pressure differential maintains the contact. A calibrated leak may be provided through the contacting valve element and valve seat to allow the valve element to be released after the head is reattached by merely closing off the sprinkler head opening.

18 Claims, 1 Drawing Sheet

U.S. Patent  Apr. 12, 1988  4,736,889
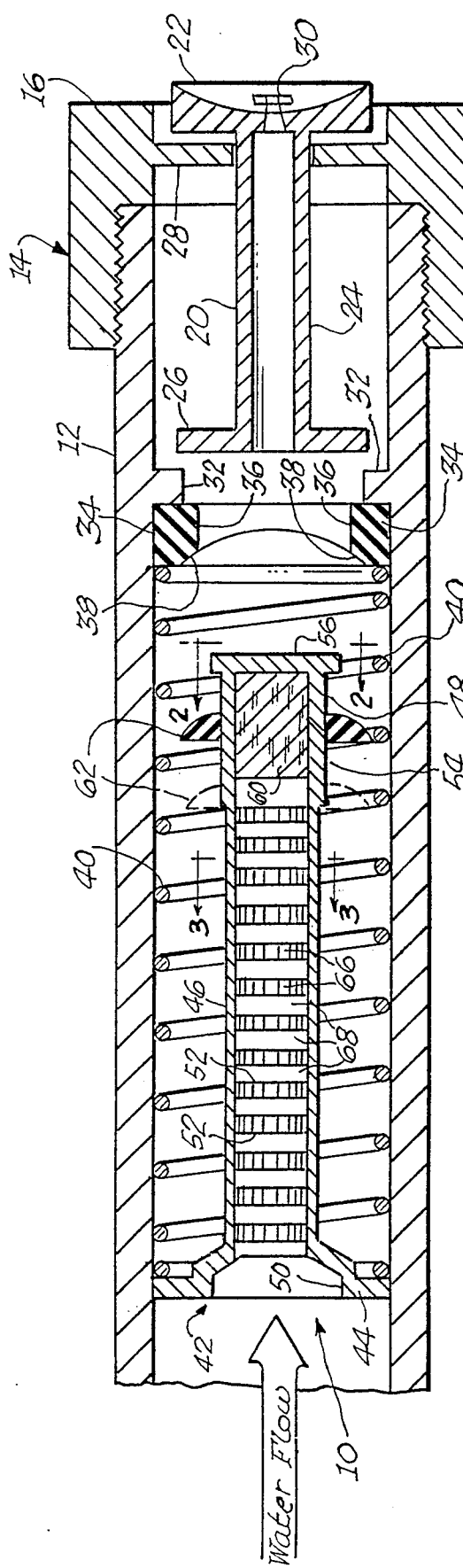

SHUT-OFF VALVE FOR SPRINKLER SYSTEM

This invention relates to a sprinkler system shut-off valve and more particularly to such a valve which eliminates or greatly reduces the water flow through a sprinkler outlet when the head has become dislodged from the riser pipe.

Sprinkler systems have become commonplace in today's society. Typically, these systems include a series of pipes buried beneath the ground. At predetermined positions, each of the pipes has a Tee-fitting placed therein and a short piece of pipe, called a riser, is attached to the central portion of the Tee-fitting and extends up to approximately ground level. Coupled to the other end of the riser pipe is a sprinkler head of any conventional type.

The sprinkler system must be designed so that the entire area is watered by the various sprinkler heads. In determining the spacing of the heads, the pressure of the water source and the amount of water flowing from the water source (pipe size) are considered. As long as these two variables remain constant, proper spacing of the heads can be achieved and full coverage of the area being water can be obtained.

It is not uncommon with any sprinkler system that a sprinkler head can become dislodged from the riser pipe. This causes two major problems when attempting to water the lawn. First, a gusher of water will shoot straight up out of the riser pipe which under calm conditions can fall in a stream and cause erosion damage to the surrounding area. Second, because the riser pipe has a substantially larger cross-sectional area than the opening in the dislodged sprinkler head, the water pressure at, and hence the amount of water going through, the remaining heads on that system is greatly diminished. This, in turn, causes less than 100 percent coverage of the area being sprinkled.

When a head becomes dislodged from the riser, which can occur through many avenues, such as, mowing the lawn, inadvertently kicking the head and the like. It would be desirable to have some type of mechanism within the sprinkler system piping to prevent the gusher of water from running out of the riser pipe associated with a dislodged head, but which has no effect when the head is properly connected to the riser pipe. This mechanism would prevent the large gusher of water from damaging the ground as well as maintain the pressure and water flow at the other heads. Under certain circumstances, it may be desirable to allow a small amount of water, equivalent to the water flow with the head attached, to seep through the valve in order to maintain the integrity of the pressure at the remaining heads. Further, such a slight seepage of water would at least water a portion of the area surrounding the dislodged head, even though the entire portion could not be watered.

In accordance with one aspect of this invention, there is provided a shut-off valve for use in a sprinkler system having a water source path throughout an area and at least one riser pipe connecting the water source path with a sprinkler head. The sprinkler head has an opening therein, substantially less in area then the cross sectional area of the riser pipe, whereby the water flow through the riser pipe is restricted by the head, when attached to the riser pipe. The valve restricting the water flow through the riser pipe when the sprinkler head becomes dislodged comprises a valve seat positioned within the riser pipe and means for limiting the downstream movement of the seat. In addition, the valve includes a coil spring having one end positioned against the upstream side of the valve seat and means, including a flange, a stem and a valve element, in which the flange is positioned against the other end of the spring, the stem is affixed to the flange and extends from the flange into the center of the spring and the stem has a length less than the normal length of the spring. The valve element is positioned around the stem and has a cross sectional size less than the inner cross sectional area of the spring while being sized to engage the seat to prevent water flow therethrough upon compression of the spring. The flange and the stem have a water flow path from the upstream side of the flange into the center of the spring and the spring is selected to have a length and a tension so that the valve element is held away from the valve seat when the water flow through the riser pipe is restricted by the head and engages the seat when the head has become dislodged from the riser pipe.

One preferred embodiment of the subject invention is hereafter described with specific reference being made to the following Figures, in which:

FIG. 1 is a cross sectional view across the length of the shut-off valve of the subject invention when positioned within a riser pipe connected to a pop-up type sprinkler head;

FIG. 2 is a view taken across line 2—2 of FIG. 1;

FIG. 3 is a view taken across line 3—3 of FIG. 1; and

FIG. 4 is an alternate embodiment of the valve seat of the subject invention.

Referring to FIG. 1, shut-off valve 10 is shown wholly within the center of a riser pipe 12. A pop up type sprinkler head 14 has been secured to the threads of riser pipe 12 and includes a fitting 16 which can be threaded around the threads of pipe 12. Fitting 16 has an opening 18 therein through which the sprinkler head assembly 20 is positioned. Assembly 20 includes the sprinkler head 22, the shaft 24 and the stop and seal assembly 26. Sprinkler head assembly 20 is adapted to move from the position shown in FIG. 1 towards the right until the stop and seal assembly 26 is engaged with the bottom 28 of fitting 16.

Water, which normally flows within pipe 12, forces the stop and seal assembly 26 up against bottom 28. A water flow path exists through the the hollow center of shaft 24 to the sprinkler head 22 opening 30. Because the center of shaft 24 and opening 30 are substantially less in cross sectional area then the cross sectional area of pipe 12, the water exiting from opening 30 is under high pressure. (not shown) Deflection apparatus can cause the water to be sprayed throughout a circular or sector area in a known manner.

In a conventional lawn sprinkling system, many heads similar to head 14 are connected through riser pipe similar to pipe 12 to a common source of water. The source of water is under a relatively stable pressure and thus the spacing of the various sprinkler heads, such as head 14, over the lawn area being sprinkled is based on the assumption that each of the heads 14 will always be connected to a water source with a certain pressure. The problem occurs, however, when head 14 becomes dislodged from pipe 12. This allows a steady stream of water, limited only by the diameter of pipe 12, to be expelled from the open end of pipe 12. This stream of water on a particularly calm day can cause erosion of the lawn. Further, the stream of water reduces the overall system pressure so that the area sprinkled by the other heads similar to head 14 is less than was originally calculated.

By inserting shut off valve 10 within riser pipe 12 upstream from the water source and downstream from sprinkler head 14, the large stream of water exiting pipe 12 whe head 14 becomes dislodged can be prevented. In order for this to occur, shut off valve 10 should be sensitive to the amount of water flowing through pipe 12. This amount of water is limited by the opening 30 of sprinkler head 14, when head 14 is properly attached to pipe 12, and when head 14 becomes dislodged, the amount of water flowing through pipe 12 a significantly higher. Shut off valve 10 is calibrated to remain open while the lower amount of water, limited by opening 30, flows through pipe 12 but becomes shut and remains shut if the water flow increases beyond a certain point, which point would be between the amount of water flowing when head 14 is attached and the amount of water flowing when head 14 is dislodged.

Shut off valve 10 is built within pipe 12 upstream from stop 32. Stop 32 may be glued into the interior of pipe 12 or may be molded within pipe 12 during the fabrication thereof. Stop 32 may be simply a concentric ring around the interior wall of pipe 12 and should be sufficiently downstream from the stop and seal assembly 26 of head 14 to prevent interference between the two.

Positioned against stop 32 is valve seat 34, which may be a conventional rubber washer assembly having an opening 36 therein. The size of opening 36 should be substantially larger than the opening in shaft 24 of sprinkler head assembly 14. The lip 38 of valve seat 34 may be made to curve slightly into opening 36 in order to allow a good seal to be formed, as will hereafter be explained.

Positioned against valve seat 34 is a coil spring 40. Spring 40 has an outer diameter substantially the same as the inner diameter of pipe 12. When properly sized, spring 40 is free to be compressed, yet rests firmly against the inner sides of pipe 12 to prevent it from falling into the main sprinkler system pipes beneath the lawn being sprinkled.

Positioned against and affixed to the other side of spring 40 is valve element assembly 42. Alternatively a second stop, similar to stop 32 may be placed upstream from value element assembly 42 to prevent it from falling into the main pipes. Valve element assembly 42 includes a base 44, a shaft 46 and a head 48. An opening 50 is provided through base 44 to allow water flow into the center of shaft 46. The outer walls of shaft 46 include a plurality of openings 52 circumferentially positioned about shaft 46. These openings allow the water entering through opening 50 to flow to the outside of shaft 46. As seen in FIGS. 1 and 3, the openings 52 are constructed between a series of longitudinal spaced ribs 66 held apart by spaced rings 68.

Head 48 of valve element assembly 42 includes a solid extension 54 from shaft 46 and a face element 56 covering the open end of extension 54. As seen in FIG. 2, face 56 has a plurality, such as four, of small openings 58 therein which may be calibrated to provide approximately the same amount of water flow that would occur when sprinkler head 14 is properly attached to pipe 12. Referring again to FIG. 1, a filter element 60 is provided within solid extension 54 upstream from openings 58 in order to prevent any sand or stones within the water supply from clogging the openings 58. Filter element 60 may be simply a sponge or piece of cloth.

Valve element 62 is positioned around the outer side of extension 54 and may be moveable thereon in a lateral direction along extension 54. This is indicated by the dashed version of valve element 62. Valve element 62 is shaped to form a solid seating effect with valve seat 34 when the two are forced into contact with one another when sufficient water flows through pipe 12 and forces valve element assembly 42 downstream.

Shut off valve 10 operates in the following manner. The water flow, as indicated by the arrow to the left of FIG. 1, provides a force against base 44 of valve element assembly 42. This force compresses spring 40, so that valve element 62 moves towards valve seat 34. As long as sprinkler head 14 is properly attached to pipe 12, the water flow through pipe 12 is limited by the size of opening 30. This limitation on the water flow, in turn limits the force imparted to base 44. The tension of spring 40 is selected so that during this period of time, the amount of compression of spring 44 is insufficient to cause valve element 62 to contact valve seat 34. Thus, water flows into opening 50 and out through openings 52, around valve element 62 and through opening 34 into opening 30 and normal sprinkling action occurs.

If head 14 becomes dislodged from pipe 12, the amount of water flow through pipe 12 increases significantly. This, in turn, increases the force applied against base 44 and causes additional compression of spring 40. Spring 40 is selected so that, in this circumstance, it is compressed sufficiently such that valve element 62 comes in firm contact with valve seat 34, thereby closing the water flow path through opening 36 within valve seat 34. The contacting valve element 62 and valve seat 34 stops the large column of water extending from pipe 12 when head 14 is removed. Once valve element 62 contacts valve seat 34, a significant pressure differential exists on both sides of now closed opening 36. This pressure differential maintains valve element 62 in firm contact with valve seat 34 so that the opening 36 is maintained closed to water flowing therethrough.

Under certain circumstances it is desired that some water flow through pipe 12 even when shut off valve 10 is in the closed position. This is accomplished by openings 58 provided in face 56. Alternatively, slots 64 could have been provided in seat 34 to allow the contact between valve element 62 and seat 34 to provide a leaky seal. This structure is shown in FIG. 4.

The reason that it is desired to have a small amount of water flowing through the closed shut off valve 10 is that without such water flow it would be necessary to turn off the entire sprinkling system and allow the pressure to return to near zero before the valve would be open by the force against compression provided by spring 40. However, in normal circumstances, when a sprinkler head 14 becomes dislodged from a pipe 12, the property owner will desire to replace that head and to turn on the system so that he can calibrate and direct the head in the proper manner. With the slight amount of water flow provided through openings 58 or slots 64, when head 14 is reattached to pipe 12, the property owner can place his finger over opening 30 to prevent the water from flowing out of opening 30. This builds up internal pressure on the downstream side of the contacting valve seat 34 and valve element 62. As the pressure builds up on the downstream side, it approaches the pressure on the upstream side of that contact. When this occurs, the forces against compression provided by spring 40 cause a movement of valve element assembly 42 away from valve seat 34, thereby opening the water flow path through opening 36 again. At this point, the property owner merely removes his finger from opening 30 and the sprinkler head is operational in the normal manner. Then proper adjustments can be made.

Under certain circumstances, it may be desirable by the property owner to turn off a particular sprinkler head for adjustment or minor repair. This can occur during normal sprinkler operation by the owner depressing the pop up head 22 and quickly releasing it. The release of the head 22 causes a momentary rapid increase in the flow of water through pipe 12. This, in turn, causes the valve element assembly 42 to surge forward against the compression of spring 40 such that valve element 62 comes in contact with valve seat 34. At that point, water stops flowing through opening 30 and the property owner can make any repairs or adjustments desired. This feature is particularly useful when, for example, a problem exists in the middle of a sprinkler system. The owner can shut off each of the heads in the area that would be sprinkling him while repairing a broken device. Thereafter, each of the elements can be turned on again by placing a finger over opening 30 in the manner previously described.

What is claimed is:

1. A shut off valve for use in a sprinkler system having a water source path throughout an area and at least one riser pipe connecting said water source path with a sprinkler head, said sprinkler head having an opening therein substantially less in area than the cross sectional area of said riser pipe, whereby the water flow through said riser pipe is restricted by said head when said head is attached to said riser pipe, said valve restricting the water flow through said riser pipe when said sprinkler head becomes dislodged, said valve comprising:
   a valve seat positioned within said riser pipe;
   means for limiting the down stream movement of said seat;
   a coil spring having one end positioned upstream from said valve seat; and
   means, including a flange, a stem and a valve element, said flange being positioned against the other end of said spring, said stem extending from said flange into the center of said spring, said stem having a length less than the normal length of said spring, said valve element being positioned around said stem and having a cross sectional size less than the inner cross sectional area of said spring while being sized to engage said seat to prevent water flow therethrough upon compression of said spring, said flange and stem having a first water flow path from the upstream side of said flange through said stem and into the center of said spring;
   said spring being selected to have a length and a tension so that said valve element is held away from said valve seat when said water flow through said riser pipe is restricted by said head and engages said seat when said head is dislodged from said riser pipe;
   said shut-off valve further having reset means, including a second water flow path when said valve element engages said valve seat, for disengaging said valve element from said valve seat when said head opening is blocked after said head is replaced on said riser pipe.

2. The invention according to claim 1 wherein said stem includes a plurality of openings evenly spaced around said stem as a part of the flow path of said flange and stem, whereby said stem is maintained centered within said spring interior.

3. The invention according to claim 1:
   wherein said valve seat includes an opening therein through which the front of said stem extends when said valve element engages said valve seat; and
   wherein said second flow path includes at least one opening through said stem front.

4. The invention according to claim 3 wherein said second flow path further includes filter means up stream from said stem front opening.

5. The invention according to claim 4 wherein said stem includes a plurality of openings evenly spaced around said stem as a part of the flow path of said flange and stem, whereby said stem is maintained centered within said spring interior.

6. The invention according to claim 1 wherein said second water flow path is formed by a leaky fit of said valve element and said valve seat.

7. The invention according to claim 6 wherein said stem includes a plurality of openings evenly spaced around said stem as a part of the flow path of said flange and stem, whereby said stem is maintained centered within said spring interior.

8. A shut off valve for use in a sprinkler system having a water source path throughout an area and at least one riser pipe connecting said water source path with a sprinkler head, said sprinkler head having an opening therein substantially less in area than the cross sectional area of said riser pipe, whereby the water flow through said riser pipe is restricted by said head when said head is attached to said riser pipe, said valve restricting the water flow through said riser pipe when said sprinkler head becomes dislodged, said valve comprising:
   a valve seat positioned within said riser pipe;
   means for limiting the down stream movement of said seat;
   a coil spring having one end positioned upstream from said valve seat; and
   means, including a flange, a stem and a valve element, said flange being positioned against the other end of said spring, said stem extending from said flange into the center of said spring, said stem having a length less than the normal length of said spring, said valve element being positioned around said stem and having a cross sectional size less than the inner cross sectional area of said spring while being sized to engage said seat to prevent water flow therethrough upon compression of said spring, said flange and stem having a water flow path from the upstream side of said flange through said stem and into the center of said spring;
   said spring being selected to have a length and a tension so that said valve element is held away from said valve seat when said water flow through said riser pipe is restricted by said head and engages said seat when said head is dislodged from said riser pipe
   wherein said sprinkler head is a pop-up head; and
   wherein said spring tension and length are further selected to permit said valve element to engage said valve seat during normal operation when said pop-up head is depressed and released.

9. The invention according to claim 8 wherein said stem includes a plurality of openings evenly spaced around said stem as a part of the flow path of said flange and stem, whereby said stem is maintained centered within said spring interior.

10. A shut off valve for use in a sprinkler system having a water source path throughout an area and at least one riser pipe connecting said water source path with a sprinkler head, said sprinkler head having an opening therein substantially less in area than the cross sectional area of said riser pipe, whereby the water flow through said riser pipe is restricted by said head when said head is attached to said riser pipe, said valve restricting the water flow through said riser pipe when said sprinkler head becomes dislodged, said valve comprising:

a valve seat positioned within said riser pipe;
means for limiting the down stream movement of said seat;
a coil spring having one end positioned upstream from said valve seat; and
means, including a flange, a stem and a valve element, said flange being positioned against the other end of said spring, said stem extending from said flange into the center of said spring, said stem having a length less than the normal length of said spring, said valve element being positioned around said stem and having a cross sectional size less than the inner cross sectional area of said spring while being sized to engage said seat to prevent water flow therethrough upon compression of said spring, said flange and stem having a water flow path from the upstream side of said flange into the center of said spring;
said spring being selected to have a length and a tension so that said valve element is held away from said valve seat when said water flow through said riser pipe is restricted by said head and engages said seat when said head is dislodged from said riser pipe;
wherein said sprinkler head is a pop-up head;
wherein said spring tension and length are further selected to permit said valve element to engage said valve seat during normal operation when said pop-up head is depressed and released;
wherein said stem includes a plurality of openings evenly spaced around said stem as a part of the flow path of said flange and stem, whereby said stem is maintained centered within said spring interior; and
wherein said shut-off valve further includes a second water flow path therethrough when said valve element engages said valve seat.

11. The invention according to claim 10 wherein said valve element becomes disengaged from said seat element whenever the water flow is blocked downstream from said second flow path.

12. The invention according to claim 8 wherein said valve element is adjustably positionable along said stem length to compensate for different water pressure.

13. A shut off valve for use in a sprinkler system having a water source path throughout an area and at least one riser pipe connecting said water source path with a sprinkler head, said sprinkler head having an opening therein substantially less in area than the cross sectional area of said riser pipe, whereby the water flow through said riser pipe is restricted by said head when said head is attached to said riser pipe, said valve restricting the water flow through said riser pipe when said sprinkler head becomes dislodged, said valve comprising:

a valve seat positioned within said riser pipe;
means for limiting the down stream movement of said seat;
a coil spring having one end positioned upstream from said valve seat; and
means, including a flange, a stem and a valve element, said flange being positioned against the other end of said spring, said stem extending from said flange into the center of said spring, said stem having a length less than the normal length of said spring, said valve element being positioned around said stem and having a cross sectional size less than the inner cross sectional area of said spring while being sized to engage said seat to prevent water flow therethrough upon compression of said spring, said flange and stem having a water flow path from the upstream side of said flange into the center of said spring;
said spring being selected to have a length and a tension so that said valve element is held away from said valve seat when said water flow through said riser pipe is restricted by said head and engages said seat when said head is dislodged from said riser pipe;
wherein said valve element is adjustably positionable along said stem length to compensate for different water pressure;
wherein said sprinkler head is a pop-up head;
wherein said spring tension and length are further selected to permit said valve element to engage said valve seat during normal operation when said pop-up head is depressed and released; and
wherein said stem includes a plurality of openings evenly spaced around said stem as a part of the flow path of said flange and stem, whereby said stem is maintained centered within said spring interior.

14. The invention according to claim 13 wherein said shut-off valve further includes a second water flow path therethrough when said valve element engages said valve seat.

15. The invention according to claim 14 wherein said valve element becomes disengaged from said valve seat whenever the water flow is blocked downstream from said second flow path.

16. The invention according to claim 15:
wherein said valve seat includes an opening therein through which the front of said stem extends when said valve element engages said valve seat; and
wherein said second flow path includes at least one opening through said stem front.

17. The invention according to claim 16 wherein said second flow path further includes filter means up stream from said stem front opening.

18. The invention according to claim 15 wherein said second water flow path is formed by a leaky fit of said valve element and said valve seat.

* * * * *